United States Patent
Rosenboom

(10) Patent No.: US 11,714,690 B2
(45) Date of Patent: *Aug. 1, 2023

(54) AUDIO, VIDEO AND CONTROL SYSTEM IMPLEMENTING VIRTUAL MACHINES

(71) Applicant: QSC, LLC, Costa Mesa, CA (US)

(72) Inventor: Gerrit Eimbertus Rosenboom, Boulder, CO (US)

(73) Assignee: QSC, LLC, Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,107

(22) Filed: Aug. 22, 2022

(65) Prior Publication Data
US 2022/0391269 A1 Dec. 8, 2022

Related U.S. Application Data

(63) Continuation of application No. 17/146,425, filed on Jan. 11, 2021, now Pat. No. 11,474,882, which is a (Continued)

(51) Int. Cl.
*G06F 9/455* (2018.01)
*G06F 9/54* (2006.01)
(Continued)

(52) U.S. Cl.
CPC ............... *G06F 9/541* (2013.01); *G06F 8/38* (2013.01); *G06F 9/4411* (2013.01); *G06F 9/45533* (2013.01); *G06F 9/45545* (2013.01); *G06F 9/45558* (2013.01); *G06F 13/4282* (2013.01); *G06F 3/165* (2013.01); *G06F 8/61* (2013.01); *G06F 9/445* (2013.01); *G06F 2009/45562* (2013.01); *G06F 2009/45579* (2013.01); *G06F 2213/0042* (2013.01); *G06T 5/00* (2013.01)

(58) Field of Classification Search
CPC .... G06F 9/541; G06F 9/4411; G06F 9/45533; G06F 9/45545; G06F 9/45558; G06F 9/445; G06F 2009/45562; G06F 2009/45579
See application file for complete search history.

(56) References Cited

U.S. PATENT DOCUMENTS 5,490,247 A   2/1996  Tung et al.
5,913,062 A   6/1999  Vrvilo et al.
(Continued)

FOREIGN PATENT DOCUMENTS

CN   102291428 A   12/2011
CN   104956329 A   9/2015
(Continued)

OTHER PUBLICATIONS

Heo, Jin. "Voice over IP (VoIP) Performance Evaluation on VMware vSphere 5.0," Performance Study, Technical Whitepaper. Dec. 1, 2015, pp. 1-10. <www.vmware.com/content/dam/digitalmarketing/vmware/en/pdf/techpaper/voip-performance-vsphere5-whitepaper>.

(Continued)

*Primary Examiner* — Gregory A Kessler
(74) *Attorney, Agent, or Firm* — Onyx IP Group

(57) ABSTRACT

The system of the present technology includes an embodiment that provides a host audio, video and control operating system configured to establish or interact with one or more virtual machines, each with a guest operating system.

8 Claims, 6 Drawing Sheets

Related U.S. Application Data continuation of application No. 16/231,157, filed on Dec. 21, 2018, now Pat. No. 10,901,809.

(60) Provisional application No. 62/617,713, filed on Jan. 16, 2018.

(51) Int. Cl.
| | | |
|---|---|---|
| *G06F 13/42* | (2006.01) | |
| *G06F 8/38* | (2018.01) | |
| *G06F 9/4401* | (2018.01) | |
| *G06F 3/16* | (2006.01) | |
| *G06F 8/61* | (2018.01) | |
| *G06F 9/445* | (2018.01) | |
| *G06T 5/00* | (2006.01) | |

(56) References Cited

U.S. PATENT DOCUMENTS

| | | | |
|---|---|---|---|
| 6,266,408 | B1 | 7/2001 | Park |
| 8,069,206 | B2 | 11/2011 | McDonald |
| 8,150,052 | B2 | 4/2012 | Gygax et al. |
| 8,365,168 | B1 | 1/2013 | Kodorkin et al. |
| 8,441,515 | B2 | 5/2013 | Yam |
| 8,558,618 | B2 | 10/2013 | Nussbaum et al. |
| 8,738,972 | B1 | 5/2014 | Bakman et al. |
| 8,774,399 | B2 | 7/2014 | Khanduri et al. |
| 8,873,741 | B2 | 10/2014 | Ballagas et al. |
| 9,008,302 | B2 | 4/2015 | Thapa et al. |
| 9,223,635 | B2 | 12/2015 | Huang et al. |
| 9,258,266 | B2 | 2/2016 | Nataraja et al. |
| 9,357,171 | B2 | 5/2016 | Toren et al. |
| 9,543,913 | B2 | 1/2017 | Quilter et al. |
| 9,628,206 | B2 | 4/2017 | Perkins |
| 9,641,559 | B2 | 5/2017 | Maistri et al. |
| 9,749,072 | B2 | 8/2017 | Perkins |
| 9,781,386 | B2 | 10/2017 | Ben Natan et al. |
| 9,935,915 | B2 | 4/2018 | Manley et al. |
| 10,901,809 | B2 | 1/2021 | Rosenboom |
| 11,063,565 | B2 | 7/2021 | Lind et al. |
| 11,194,607 | B2 | 12/2021 | Rosenboom |
| 11,276,417 | B2 | 3/2022 | Moravy et al. |
| 11,474,882 | B2 | 10/2022 | Rosenboom |
| 11,561,813 | B2 | 1/2023 | Rosenboom |
| 2002/0116234 | A1 | 8/2002 | Nagasawa |
| 2005/0091051 | A1 | 4/2005 | Moriya et al. |
| 2007/0165837 | A1 | 7/2007 | Zhong et al. |
| 2008/0002663 | A1 | 1/2008 | Tripathi et al. |
| 2008/0019365 | A1 | 1/2008 | Tripathi et al. |
| 2010/0011200 | A1 | 1/2010 | Rosenan |
| 2010/0058335 | A1 | 3/2010 | Weber |
| 2010/0107162 | A1 | 4/2010 | Edwards et al. |
| 2010/0146544 | A1 | 6/2010 | Aoki et al. |
| 2010/0272251 | A1 | 10/2010 | Banba et al. |
| 2011/0078681 | A1 | 3/2011 | Li et al. |
| 2011/0090915 | A1 | 4/2011 | Droux et al. |
| 2011/0099485 | A1 | 4/2011 | Alcorn et al. |
| 2012/0184373 | A1 | 7/2012 | Kim et al. |
| 2012/0198444 | A1 | 8/2012 | Tsai |
| 2012/0230519 | A1 | 9/2012 | Nussbaum et al. |
| 2012/0296626 | A1 | 11/2012 | Bond et al. |
| 2013/0097244 | A1 | 4/2013 | Manley et al. |
| 2014/0064104 | A1 | 3/2014 | Nataraja et al. |
| 2014/0080428 | A1 | 3/2014 | Rhoads et al. |
| 2014/0082612 | A1 | 3/2014 | Breitgand et al. |
| 2014/0123135 | A1 | 5/2014 | Huang et al. |
| 2014/0139615 | A1 | 5/2014 | Graham et al. |
| 2014/0148934 | A1 | 5/2014 | Manley et al. |
| 2014/0192989 | A1 | 7/2014 | Quilter et al. |
| 2014/0282793 | A1 | 9/2014 | Kasatani |
| 2015/0127830 | A1 | 5/2015 | Brown et al. |
| 2015/0146715 | A1 | 5/2015 | Olivier et al. |
| 2015/0146716 | A1 | 5/2015 | Olivier et al. |
| 2015/0264035 | A1 | 9/2015 | Waterhouse et al. |
| 2015/0288735 | A1 | 10/2015 | Krishnamoorthy et al. |
| 2016/0241604 | A1 | 8/2016 | Klein et al. |
| 2016/0360317 | A1 | 12/2016 | Lee et al. |
| 2017/0055076 | A1 | 2/2017 | Buono et al. |
| 2019/0220299 | A1 | 7/2019 | Rosenboom |
| 2019/0220300 | A1 | 7/2019 | Rosenboom |
| 2019/0220328 | A1 | 7/2019 | Rosenboom |
| 2019/0267957 | A1 | 8/2019 | Lind et al. |
| 2021/0271528 | A1 | 9/2021 | Rosenboom |
| 2022/0164213 | A1 | 5/2022 | Rosenboom |

FOREIGN PATENT DOCUMENTS

| | | |
|---|---|---|
| CN | 105794169 A | 7/2016 |
| EP | 1853086 A1 | 11/2007 |
| EP | 3169040 A1 | 5/2017 |
| JP | 2009253524 A | 10/2009 |
| WO | 2011143434 A1 | 11/2011 |
| WO | 2014066820 A2 | 5/2014 |

OTHER PUBLICATIONS

International Searching Authority, International Search Report and Written Opinion, PCT Patent Application PCT/US2018/067358, dated Mar. 27, 2019, 11 pages.
International Searching Authority, International Search Report and Written Opinion, PCT Patent Application PCT/US2018/067368, dated May 14, 2019, 17 pages.
International Searching Authority, International Search Report and Written Opinion, PCT Patent Application PCT/US2018/067379, dated May 20, 2019, 18 pages.
International Searching Authority, International Search Report and Written Opinion, PCT Patent Application PCT/US2019/019307, dated Sep. 12, 2019, 20 pages.
International Searching Authority, Partial International Search Report, PCT Patent Application PCT/US2018/067368, dated Mar. 19, 2019, 13 pages.
International Searching Authority, Partial International Search Report, PCT Patent Application PCT/US2018/067379, dated Mar. 27, 2019, 13 pages.
Wikipedia. "Advanced Linux Sound Architecture", Dec. 11, 2017, 5 pages. <en.wikipedia.org/w/index.php? title=Advanced_Linux_Sound_Architecture&oldid=814921790> accessed on Feb. 11, 2022.
Xi, Sisu et al. "Rt-open stack: CPU resource management for real-time cloud computing." 2015 IEEE 8th International Conference on Cloud Computing, pp. 179-186.

AUDIO, VIDEO AND CONTROL SYSTEM IMPLEMENTING VIRTUAL MACHINES

CROSS-REFERENCE TO RELATED APPLICATION

This application is a continuation of U.S. application Ser. No. 17/146,425, titled Audio, Video and Control System Implementing Virtual Machines, filed Jan. 11, 2021, which is a continuation of U.S. application Ser. No. 16/231,157, titled Audio, Video and Control System Implementing Virtual Machines, filed Dec. 21, 2018, now Issued U.S. Pat. No. 10,901,809, granted Jan. 26, 2021, which claims the benefit of and priority to U.S. provisional patent application 62/617,713, titled Audio, Video and Control System Implementing Virtual Machines, filed Jan. 16, 2018, all of which are incorporated herein in their entirety by reference.

TECHNICAL FIELD

The present disclosure is directed to audio, video and control systems.

BACKGROUND

Conventional audio, video, and control (AVC) systems are typically configured to interconnect, operate and manage audio systems, video systems and/or control systems for an identified location, such as in conference rooms, meeting centers, convention centers, classrooms, entertainment centers, multi-room buildings, other structures, etc. An example of a highly powerful, versatile, and configurable AVC system is the Q-Sys® product, manufactured and provided by QSC, LLC, of Costa Mesa, Calif. AVC systems are often used to perform AVC processing for applications executed by another local conventional computer system, such as a computing system running a Windows®-based operating system. For example, an AVC system may be paired with a conventional computer system in a conference room or lecture hall. This type of pairing allows the AVC system to provide AVC processing that may be incompatible with conventional computer systems.

To allow the AVC system to communicate with the Windows®-based operating system for the AVC processing, the systems can be interconnected, such as with a USB connection between the two physical computer systems. Integration of the two systems, however, can be difficult, time consuming and operationally limited. For example, Q-Sys® is a software-based platform that uniquely leverages the power of Intel processing, the robustness and mission critical reliability of a Linux operating system, and the interoperability of IEEE networking standards and provides an IT-centric layered approach that allows the operator to easily migrate the Q-SYS Platform to other Intel platforms, such as new, faster chipsets, and to other off-the-shelf hardware. Furthermore, Q-Sys's usage of IT standard protocols makes the Q-SYS platform highly extensible for future IT functions and platforms. The powerful Q-Sys® AVC system can be hardwire connected to communicate with separate computer systems running a Windows®-based operating system, but such configurations between systems can be difficult to integrate to avoid cross-system conflicts, which may result in slower performance and limited cross-system performance, while also requiring two physically interconnected structures.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Embodiments of the present technology provide a host audio, video and control (AVC) operating system configured to establish or interact with one or more virtual machines, each with a guest operating system. In one embodiment, the AVC system comprises an AVC operating system based on a first operating system platform and being configured to run a guest operating system on a virtual machine, wherein the guest operating system is based on a second operating system platform different than the first operating system platform, so as to overcome drawbacks of the prior art and to provide additional benefits. In at least one embodiment, the AVC operating system is a real-time host operating system configured for audio, video and/or control processing, as well as to exchange real-time AVC streams between the AVC operating system and the guest operating system in a manner such that an application running in the guest operating system is unaware that it is not communicating directly with audio and/or video peripheral hardware connected to the AVC operating system.

The AVC system is a system configured to manage and control functionality of audio features, video features, and control features. For example, an AVC system can be configured for use with networked microphones, cameras, amplifiers, and/or controllers. The AVC system can also include a plurality of related features, such as acoustic echo cancellation, multi-media player and streamer functionality, user control interfaces, scheduling, third-party control, voice-over-IP (VoIP) and Session Initiated Protocol (SIP) functionality, scripting platform functionality, audio and video bridging, public address functionality, other audio and/or video output functionality, etc. One example of an AVC system is included in the Q-Sys technology from QSC, LLC.

In the present disclosure, an operating system (OS) can be system software that manages computer hardware and software resources and provides common services for computer programs. The operating systems can be configured to schedule tasks for efficient use of the system and may also include accounting software for cost allocation of processor time, mass storage, printing, and other resources. The operating system can also act as an intermediary between programs and the computer hardware for controlling hardware functions such as input and output and memory allocation.

Figure 1:
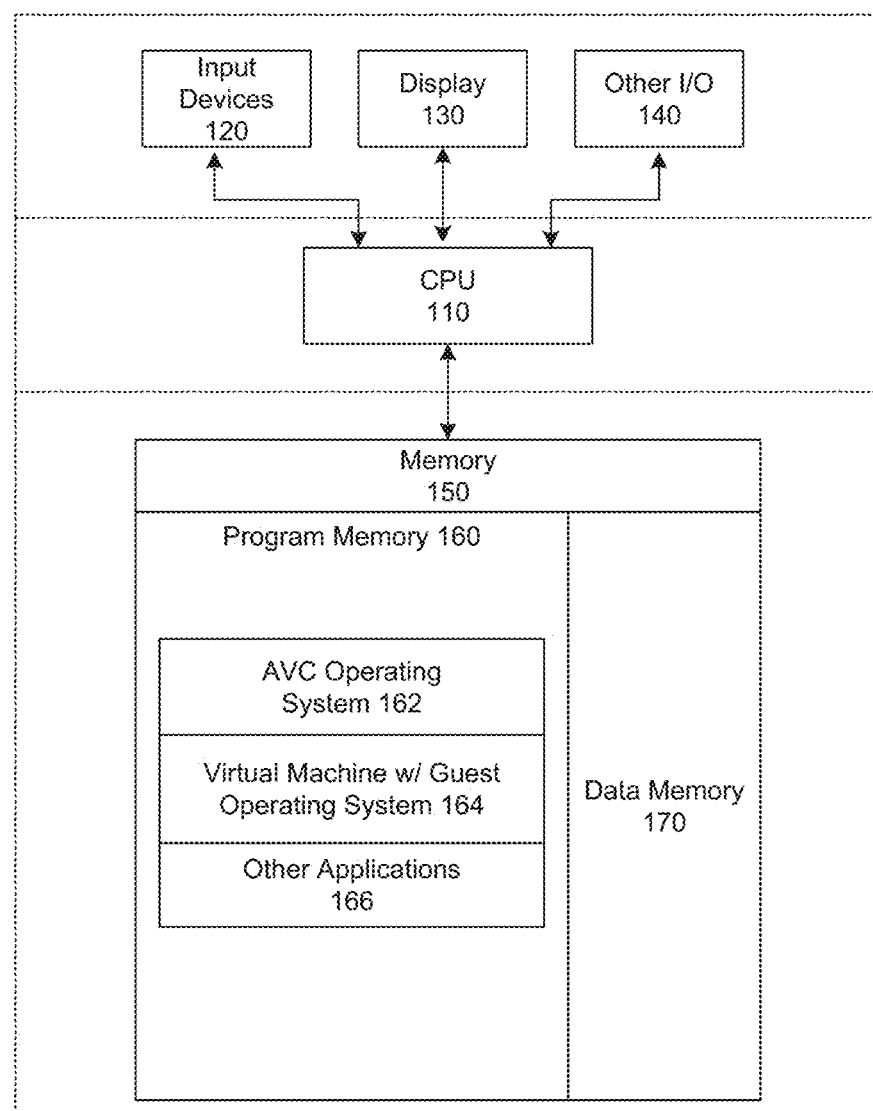
FIG. 1 is a block diagram illustrating an overview of devices on which some implementations of the present technology can operate.

Several implementations are discussed below in more detail in reference to the figures. FIG. 1 is a block diagram illustrating an overview of devices on which some implementations of the disclosed technology can operate. The devices can comprise hardware components of a device 100 with a host AVC OS 162 that establishes and interacts with one or more virtual machines 164, that each have a guest OS. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices. A virtual machine can be one or more computer applications used to create a virtual environment that allows a user to run multiple operating systems on one computer at the same time.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols, a Q-LAN protocol, or others. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an AVC operating system 162, virtual machine with guest operating system 164, and other application programs 166. Memory 150 can also include data memory 170 that can include data to be operated on by applications, configuration data, settings, options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, AV I/O systems, networked AV peripherals, video conference consoles, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
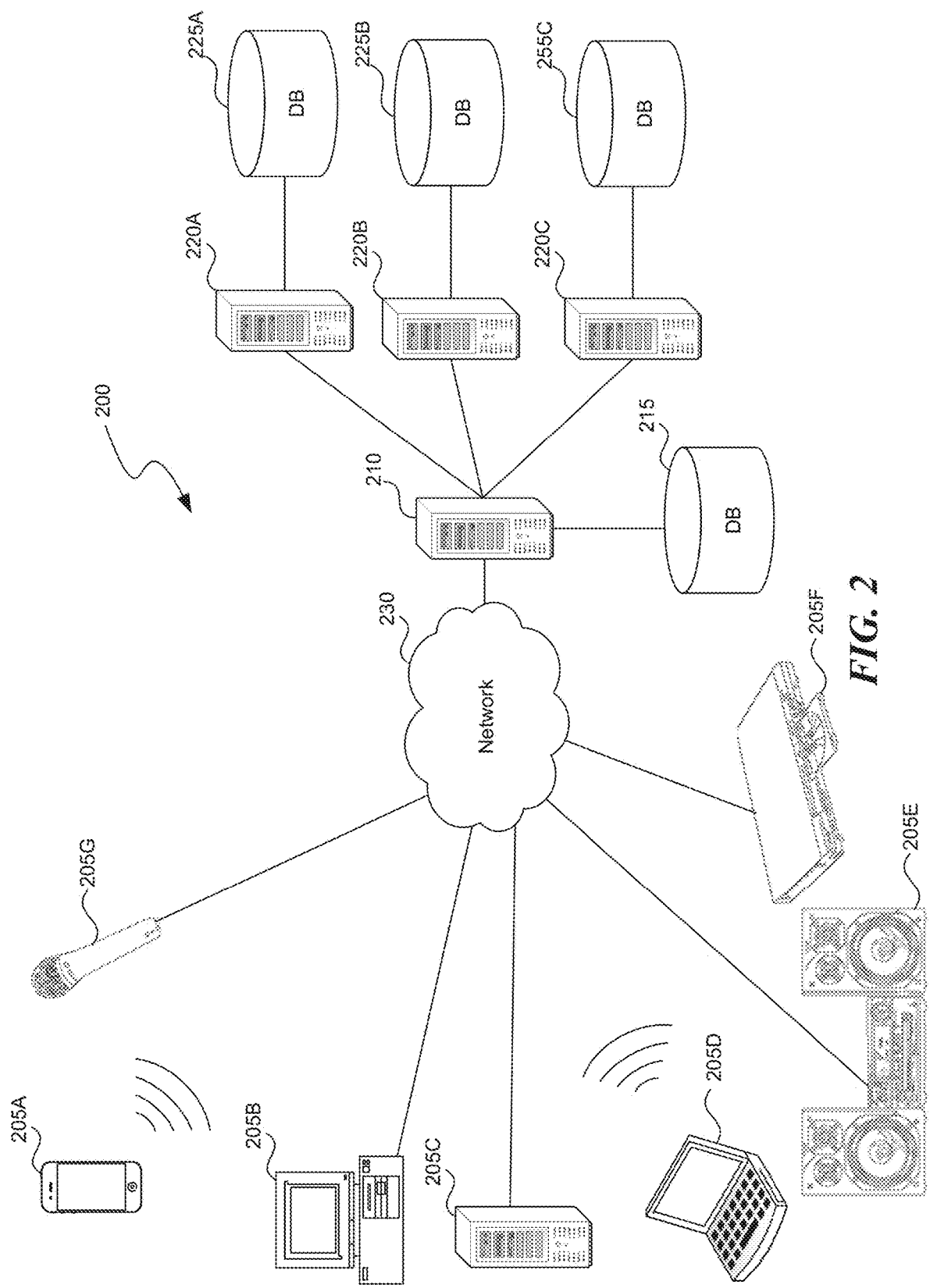
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-H, examples of which can include device 100. In the illustrated embodiment, device 205A is a wireless smart phone or tablet, device 205B is a desk-top computer, device 205C is a computer system, device 205D is a wireless laptop, device 205E is an audio system, device 206F is a video system, device 205G is a microphone system, and device 205H is a networked camera system. These are only examples of some of the devices, and other embodiments can include other computing devices. For example, device 205C can be an AV Core system with a real-time operating system (RTOS) that provides various audio and video processing and connectivity for and between peripheral devices (whether local or networked). These processing and connectivity features can be provided by the host AVC OS of device 205C while concurrently supporting one or more virtual machines. Audio and video processing can include gain and level adjustments, echo reduction or cancellation, mixing, encoding/decoding, resolution adjustments, cropping, delay control, VoIP/SIP interface control, input control, etc. Client computing devices 205 can operate in a networked environment using logical connections 210 through network 230 to one or more remote computers, such as a server computing device. In some implementations, additional unshown audio and video processing and routing components can be included in environment 200, such as: AV equipment locally connected to devices 205 or I/O cards that provide networked points of connection for AV equipment, switches operating on a Q-LAN protocol, etc.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. In some implementations, portions of network 230 can be a LAN or WAN implementing a Q-LAN protocol—an audio over IP networking technology of the Q-Sys audio signal processing platform from QSC, LLC (see, www.qsc.com). Portions of network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
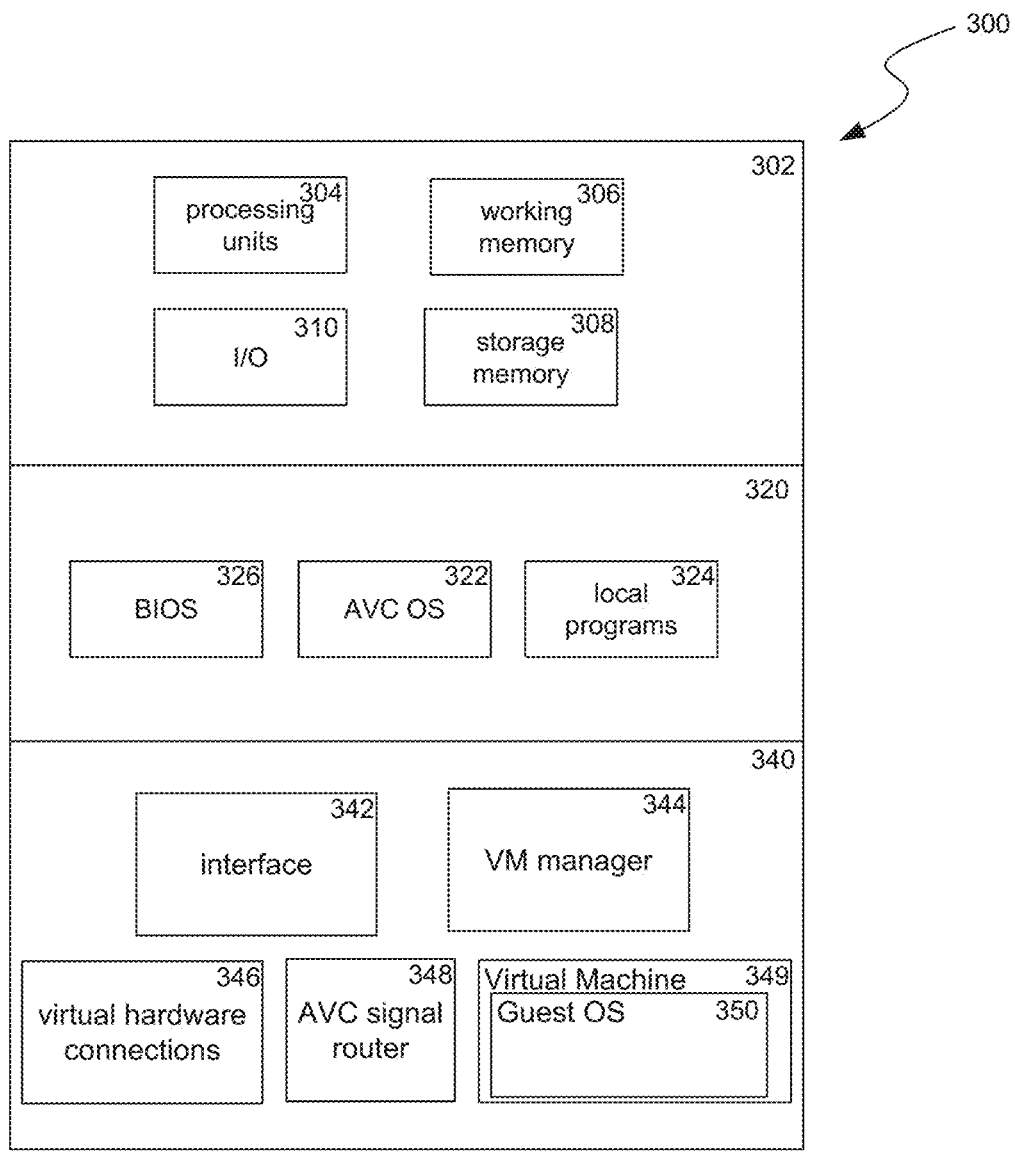
FIG. 3 is a block diagram illustrating components which, in some implementations, can be used in an AVC system, employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an AVC operating system 322, local programs 324, and a basic input output system (BIOS) 326. In some implementations, specialized components 340 can be subcomponents of one or more of the general software applications 320, such as AVC OS 322. Specialized components 340 can include VM manager 344, virtual hardware connections 346, AVC signal router 348, and components which can be used for providing user interfaces, transferring data, and controlling the specialized components, such as interface 342. In some implementations, components 300 can be in a computing system that is distributed across multiple computing devices or can be an interface to a server-based application executing one or more of specialized components 340.

VM manager 344 can manage one or more virtual machines such as virtual machine 349, in a computing system with a host AVC OS 322. VM manager 344 can create virtual machines, install guest operating systems, such as guest OS 350, into them, and establish virtual hardware connections 346 between the virtual machines and the host AVC OS 322.

Virtual hardware connections 346 can be one or more virtual objects managed by the host AVC OS 322 that provide a data path for AVC signals to be passed by the host AVC OS 322 to the guest OS 350 operated under virtual machine 349. Virtual hardware connections 346 can appear as locally connected hardware peripherals to the guest OS 350. In some implementations, one or more of the virtual hardware connections 346 can be virtual USB connections or virtual ethernet connections.

AVC signal router 348 can receive AVC signals, e.g. from a local or network connected peripheral device, provide them to the AVC OS 322 for processing, and then route them across the virtual hardware connections 346 to guest OS 350 operating on virtual machine 349. In some implementations, this can be accomplished using an isochronous link between the AVC OS 322 and a virtual USB connection of the virtual hardware connections 346. AVC signal router 348 can also receive AVC signals sent across a virtual hardware connection 346 from the guest OS 350, provide them to the AVC OS 322 for processing, and then route them to an appropriate network or locally connected destination device.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
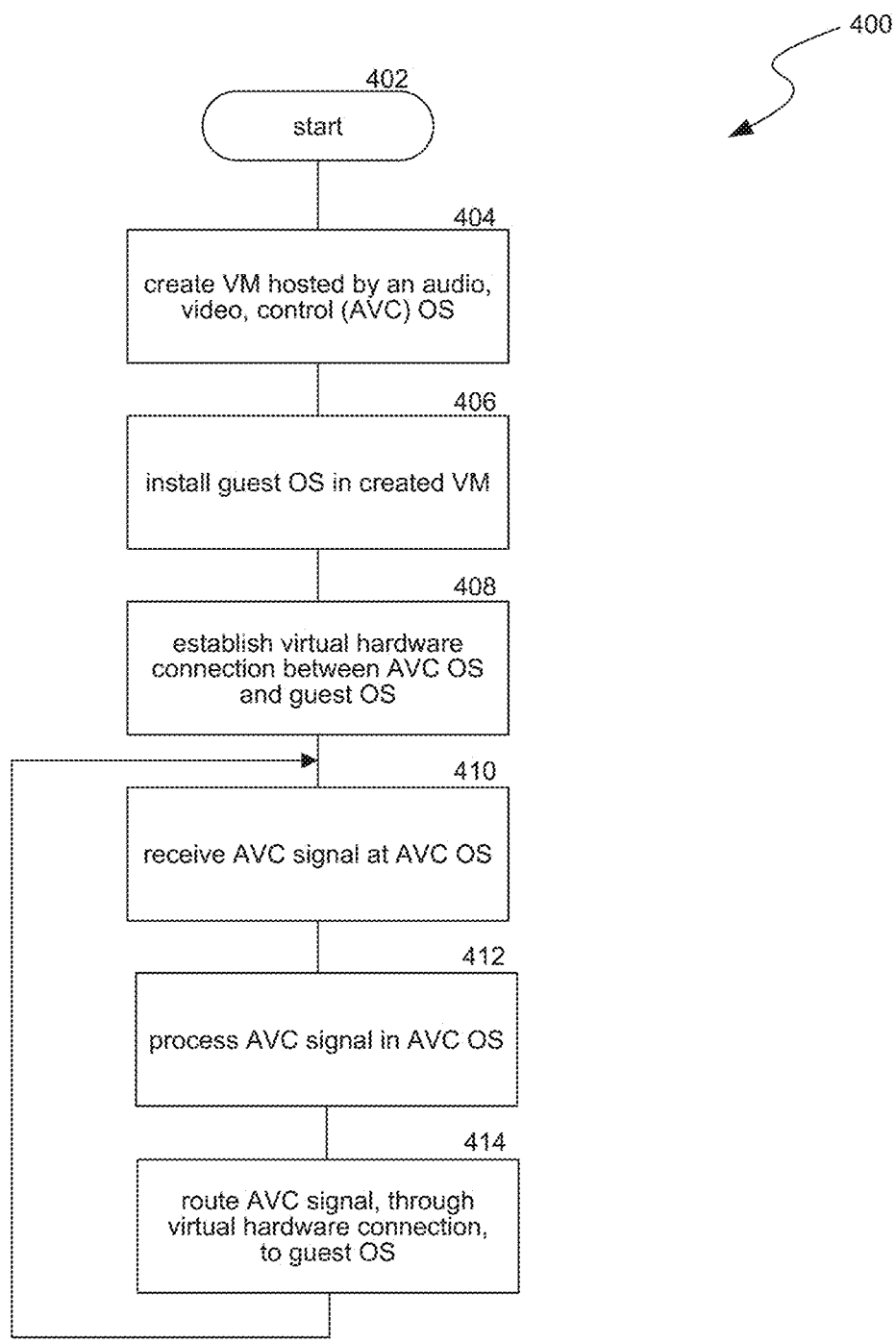
FIG. 4 is a flow diagram illustrating a process used in some implementations for a host AVC operating system (OS) to establish and interact with a virtual machine with a guest OS.

FIG. 4 is a flow diagram illustrating a process 400 used in some implementations for a host AVC OS to establish and interact with a virtual machine with a guest OS. Process 400 begins at block 402 and continues to block 404.

At block 404, process 400 can create a virtual machine hosted by an audio, video, control (AVC) operating system (OS). In some implementations, the AVC OS can be implemented as a real-time OS. In some implementations, the AVC OS can be compatible with the x86 framework. The AVC OS, in addition to creating and managing the virtual machines, can be configured to perform various audio, video, and control processing functions. An example AVC OS is the Q-SYS OS provided by QSC Audio Products. In some implementations, the AVC OS can include two separate systems: an AVC processing component and an AVC application management component. In various implementations, these systems can be combined under an umbrella AVC OS or can be separately managed components, e.g. in their own virtual machines or have their own dedicated resources. In some implementations, the host machine or the one or more virtual machines can each have a dedicated set of resources such as a dedicated area of memory or cache, dedicated CPU cores, dedicated peripherals, etc. When implementing operating systems in virtual machines with different operating systems, having shared resources can cause problems such as portions of a shared L3 cache being overwritten. This can result in cache thrashing where each application is constantly having to reload its needed data from RAM. This can be a particular detriment to a real-time operating system where input needs to be processed and provided to a destination within a particular time limit, for example to avoid skips and loss in AV quality. When each operating system has its own dedicated resources, such interference between the virtual machines does not occur.

In some implementations, process 400 can take step 404 multiple times, implementing multiple virtual machines. In some cases, each virtual machine can include a different guest OS. For example, a first guest OS in a first virtual machine can execute the Windows OS while a second guest OS in a second virtual machine can execute the Chrome OS.

At block 406, a guest OS can be installed in the virtual machine created at block 404. The guest OS can be, for example, a Windows operating system, a Chrome operating system, a Mac operating system, a Linux operating system, etc. In some implementations, instead of first creating a virtual machine environment and then installing a guest OS into it, blocks 404 and 406 can be combined, e.g. by implementing a virtual machine image previously created with a guest OS already installed.

At block 408, process 400 can establish a virtual hardware connection between the AVC OS and the guest OS. The virtual hardware connection allows signals to be passed from the AVC OS to the virtual machine implementing the guest OS. The guest OS can then access them as if the signal is coming from a hardware peripheral directly connected to a machine executing the guest OS. In various implementations, the virtual hardware connection can be a virtual USB connection, a virtual Ethernet connection, other another type of virtual hardware connection. The AVC OS can create a virtual hardware connection by generating a virtual device and presenting it to the virtual machine as an available hardware component. For example, the AVC OS can create a virtual USB connection by presenting a virtual USB device board to the virtual machine. In some implementations, establishing the virtual hardware connection can include creating an isochronous connection between the AVC OS and the virtual USB connection. The isochronous connection can provide time-dependent data transfer at a steady rate, such as for audio/video streaming.

At block 410, the AVC OS can receive an AVC signal, e.g. from a locally connected or network peripheral device. For example, where process 400 is implemented by device 205C, an AVC signal can travel across network 230 from one of peripheral devices 205E-G.

At block 412, the AVC OS can perform various AVC processing on the received AVC signal. This processing, for example, can include gain and level adjustments, echo removal/reduction, mixing, encoding/decoding, color or resolution adjustments, cropping, delay control, input control, process and logic control, etc.

At block 414, the AVC OS routes processed AVC signal through the virtual hardware connection to the guest OS on the virtual machine. The AVC OS can accomplish this by providing the signal as input to the isochronous connection to the virtual USB device board. The virtual machine then recognizes the signal from the virtual USB device board as input from a hardware device, and this input can be provided to an application executing under the guest operating system. For example, the guest operating system may be controlling execution of a video chat application. Networked microphones and/or cameras can be used with this video chat application as local hardware devices due to the AVC OS providing a virtual connection from the networked device to the guest OS on the virtual machine. The video chat application can use this input as it would any other signal from a locally connected hardware component.

As additional AVC signals arrive at block 410, they can be processed and routed to the guest OS in a manner similar to that described in relation to blocks 412 and 414. In addition, AVC signals originating from the guest OS can be routed to the peripheral devices, as described in relation to FIG. 5 below.

Figure 5:
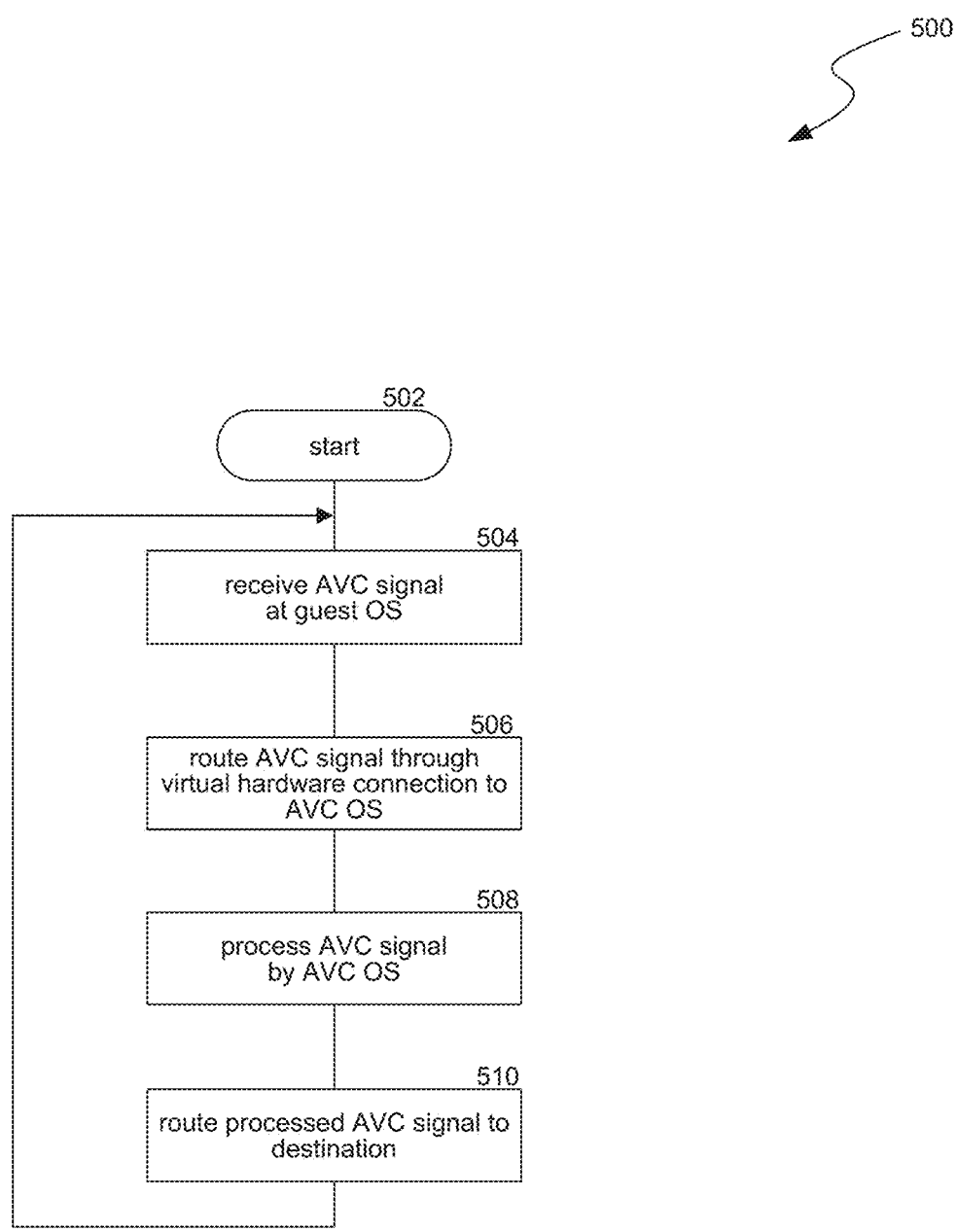
FIG. 5 is a flow diagram illustrating a process used in some implementations for a guest OS, executing under a virtual machine, to interact with a host AVC OS.

FIG. 5 is a flow diagram illustrating a process 500 used in some implementations for a guest OS, executing under a virtual machine, to interact with a host AVC OS. In some implementations, process 500 can occur in a system established by steps 404 through 408 of process 400. Furthermore, process 500 can occur in parallel with steps 410 through 414 of process 400.

Process 500 begins at block 502 and continues to block 504. At block 504, the guest OS executing on a virtual machine can receive an AVC signal. This AVC signal can be output from an application executing under the guest operating system. At block 506, process 500 can pass the AVC signal through a virtual hardware connection to a host AVC OS. For example, the guest operating system can have a driver installed for a USB device which actually corresponds to a virtual USB device board that was established to connect the virtual machine to the AVC OS at block 408. The virtual hardware connection (e.g. a virtual USB connection) can use an isochronous connection with the AVC OS to provide the AVC signal to the AVC OS.

At block 508, the AVC OS can process the AVC signal. At block 510, once the AVC signal has been processed, it can be passed to a destination device either locally connected to the device executing the host AVC OS, or through a network card to a network device.

Figure 6:
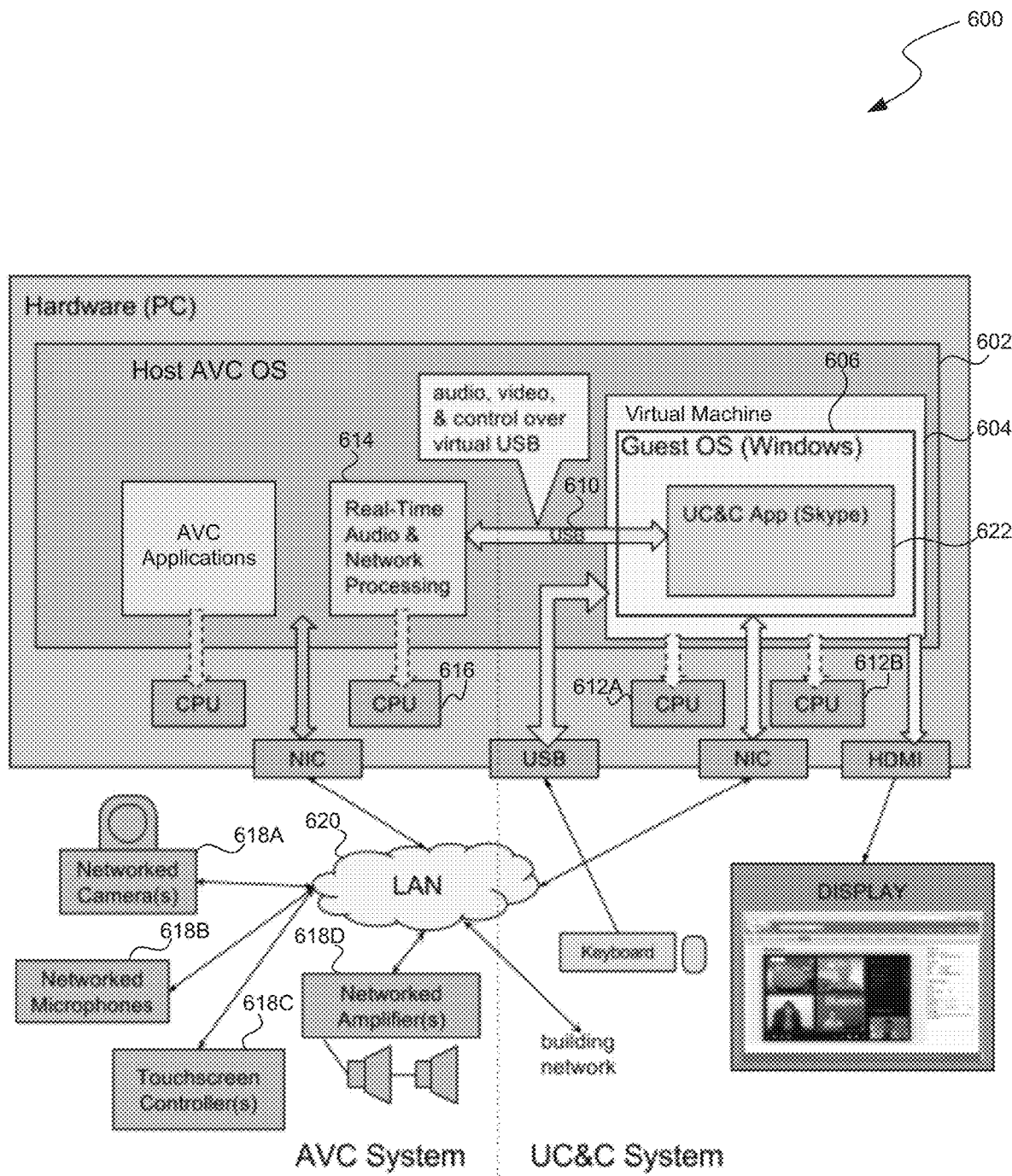
FIG. 6 is a conceptual diagram illustrating an example environment with two-way interactions between a host AVC OS and a guest OS operating on a virtual machine.

FIG. 6 is a conceptual diagram illustrating an example environment 600 with two-way interactions between a host AVC OS 602 and a guest OS 606 operating on a virtual machine 604. Example environment 600 includes a virtual USB connection 610 between the AVC OS 602 and the guest OS 606. Virtual machine 604 has dedicated CPUs 612A and 612B. AVC OS 602 includes a real-time audio and network processing component 614, which has its own dedicated CPU 616. Example environment 600 also includes networked peripherals 618A-D, capable of sending and/or receiving AVC signals across LAN 620 to the AVC OS 602.

In the operation of example environment 600, signals can be passed from networked devices 618, through LAN 620, into AVC OS 602. These signals are then processed by real-time audio and network processing component 614, using CPU 616. The processed signals can be passed through virtual USB connection 610 to the guest OS 606, executing on virtual machine 604. Guest OS 606 can treat this signal as an input from a local hardware device, which is passed to an appropriate application 622. In this case, application 622 is a video chat application. Application 622 can provide output, e.g. through the connected network interface card or display.

In the further operation of example environment 600, signals can be passed from application 622 to the guest OS 606 for output to a peripheral device. The guest OS 606 can output the signal using a driver to the virtual USB connection, which the guest OS sees as a hardware component. The signal is passed over virtual USB 610 to the AVC OS 602, which uses real-time audio and network processing component 614 to process it, using CPU 616. Once the signal is processed, AVC OS 602 can pass the signal to an appropriate directly connected destination or a destination connected to AVC OS 602 through LAN 620.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for operating a host audio, video, control (AVC) operating system (OS), the method comprising:
    creating a virtual machine on the host AVC OS, wherein the virtual machine implements a guest OS different from the host AVC OS;
    establishing a virtual hardware connection between the AVC OS and the guest OS;
    receiving an AVC signal;
    processing the AVC signal; and
    routing the processed AVC signal through the virtual hardware connection to the guest OS.

2. The method of claim 1 wherein establishing the virtual hardware connection includes creating a virtual USB connection, and wherein creating the virtual USB connection includes:
    generating a virtual USB device board; and
    presenting the virtual USB connection to the virtual machine as an available hardware component.

3. The method of claim 2 wherein establishing the virtual hardware connection further includes creating an isochronous connection between the host AVC OS and the virtual USB connection.

4. The method of claim 1, further comprising:
    receiving additional AVC signals;
    processing the additional AVC signals; and
    routing the processed additional AVC signals through the virtual hardware connection to the guest OS.

5. A system, comprising:
    one or more processors;
    a memory; and
    a real-time host audio, video, control (AVC) operating system (OS) configured to:
        create a virtual machine on the real-time host AVC OS, wherein the virtual machine implements a guest OS different from the real-time host AVC OS;
        establish a virtual hardware connection to the guest OS;
        receive an AVC signal;
        process the AVC signal; and
        route the processed AVC signal through the virtual hardware connection to the guest OS.

6. The system of claim 5 wherein the real-time host AVC OS and the virtual machine each have a corresponding dedicated set of resources.

7. The system of claim 5 wherein the guest OS is a Windows OS, a Chrome OS, a Mac OS, or a Linux OS.

8. The system of claim 5, further comprising one or more networked peripheral devices capable of sending and/or receiving AVC signals.

* * * * *